United States Patent
Bezooijen et al.

(10) Patent No.: US 8,233,856 B2
(45) Date of Patent: Jul. 31, 2012

(54) MEMS CAPACITOR CIRCUIT AND METHOD

(75) Inventors: Adrianus Van Bezooijen, Molenhoek (NL); Jacobus G. Sneep, Bavel (NL); Maurice De Jongh, Nijmegen (NL)

(73) Assignee: EPCOS AG, Munich (DE)

( * ) Notice: Subject to any disclaimer, the term of this patent is extended or adjusted under 35 U.S.C. 154(b) by 402 days.

(21) Appl. No.: 12/505,135

(22) Filed: Jul. 17, 2009

(65) Prior Publication Data

US 2010/0001768 A1    Jan. 7, 2010

Related U.S. Application Data

(63) Continuation of application No. PCT/IB2008/050123, filed on Jan. 15, 2008.

(30) Foreign Application Priority Data

Jan. 18, 2007 (EP) .................................. 07100719

(51) Int. Cl.
*H04B 1/04* (2006.01)
*H01P 5/08* (2006.01)
(52) U.S. Cl. ..... 455/121; 455/123; 455/125; 455/115.1; 333/17.3; 333/32
(58) Field of Classification Search ............... 455/115.1, 455/115.3, 120–125, 126, 67.11, 68; 333/17.3, 333/32
See application file for complete search history.

(56) References Cited

U.S. PATENT DOCUMENTS

| | | | | |
|---|---|---|---|---|
| 3,794,941 | A * | 2/1974 | Templin | 333/17.1 |
| 5,012,490 | A | 4/1991 | Myer | |
| 5,446,447 | A * | 8/1995 | Carney et al. | 340/572.4 |
| 6,535,076 | B2 * | 3/2003 | Partridge et al. | 333/17.1 |
| 6,845,126 | B2 * | 1/2005 | Dent et al. | 375/219 |
| 6,864,924 | B2 * | 3/2005 | Yamamoto | 348/731 |
| 6,868,260 | B2 * | 3/2005 | Jagielski et al. | 455/107 |
| 6,927,441 | B2 * | 8/2005 | Pappalardo et al. | 257/299 |
| 6,950,152 | B2 * | 9/2005 | Yamamoto | 348/731 |
| 6,961,368 | B2 * | 11/2005 | Dent et al. | 375/219 |
| 7,199,641 | B2 * | 4/2007 | Wei | 327/427 |
| 7,852,170 | B2 * | 12/2010 | McKinzie, III | 333/17.3 |
| 7,917,104 | B2 * | 3/2011 | Manssen et al. | 455/121 |
| 2002/0101907 | A1 * | 8/2002 | Dent et al. | 375/132 |
| 2003/0193997 | A1 * | 10/2003 | Dent et al. | 375/219 |
| 2007/0001743 | A1 * | 1/2007 | Wei et al. | 327/427 |

FOREIGN PATENT DOCUMENTS

| | | | |
|---|---|---|---|
| EP | 0 813 311 | A2 | 12/1997 |
| EP | 1 564 896 | A1 | 8/2005 |
| JP | 63-276331 | | 11/1988 |
| JP | 2004-519150 | A | 6/2004 |
| JP | 2005-318466 | | 11/2005 |
| WO | WO 02/063782 | A2 | 8/2002 |
| WO | WO 2004/008634 | A1 | 1/2004 |
| WO | WO 2006/054246 | A1 | 5/2006 |
| WO | WO 2006/117709 | A2 | 11/2006 |

* cited by examiner

*Primary Examiner* — Duc M Nguyen
(74) *Attorney, Agent, or Firm* — Slater & Matsil, L.L.P.

(57) ABSTRACT

A communications circuit processes a signal in at least one predetermined communications standard such as GSM or UMTS. A switched capacitor impedance matching unit is provided, controlled by driver control unit. The driver control unit is arranged to control the driver to start switching of the capacitors of the switched capacitor array during transition periods in the signals.

15 Claims, 8 Drawing Sheets

MEMS CAPACITOR CIRCUIT AND METHOD

This application is a continuation of co-pending International Application No. PCT/IB2008/050123, filed Jan. 15, 2008, which designated the United States and was published in English, and which claims priority to European Application No. 07100719.9 filed Jan. 18, 2007, both of which applications are incorporated herein by reference.

TECHNICAL FIELD

The invention relates to a Micro Electromechanical Systems (MEMS) device circuit and to a method of its operation, particularly but not exclusively for the control of RF signals, for example, for impedance matching.

BACKGROUND

WO 2006/054246 describes a circuit including a controlled matching stage for matching stages together, for example, a power amplifier stage may be matched to an antenna stage in a mobile telephone application. The controlled matching stage includes switched radio-frequency MEMS devices.

The MEMS devices need to be driven at relatively high voltages.

SUMMARY

The inventors have found that in a circuit such as that disclosed in WO 2006/054246 care is needed to ensure that the switching of the MEMS capacitors do not cause biasing transients. Such biasing transients can then cause switching or non-desired performance in other components of the circuit.

By switching the MEMS devices only during the transient periods, the high switching voltages have a much reduced effect on the rest of the circuit.

In some arrangements, the driver includes a clock circuit and a charge pump circuit, the clock circuit being arranged to drive the charge pump circuit wherein the driver control unit is arranged to drive the clock on only during the transition periods. In this way, any ripple caused by the clock circuit is only present during the transition periods and so is not mixed in to any transmitted RF signal.

BRIEF DESCRIPTION OF THE DRAWINGS

For a better understanding of the invention, an embodiment will now be described with reference to the accompanying drawings, in which:

FIG. 5, are drawings illustrating drive voltages used to drive MEMS devices in embodiments of the invention;

DETAILED DESCRIPTION OF ILLUSTRATIVE EMBODIMENTS

Figure 1:
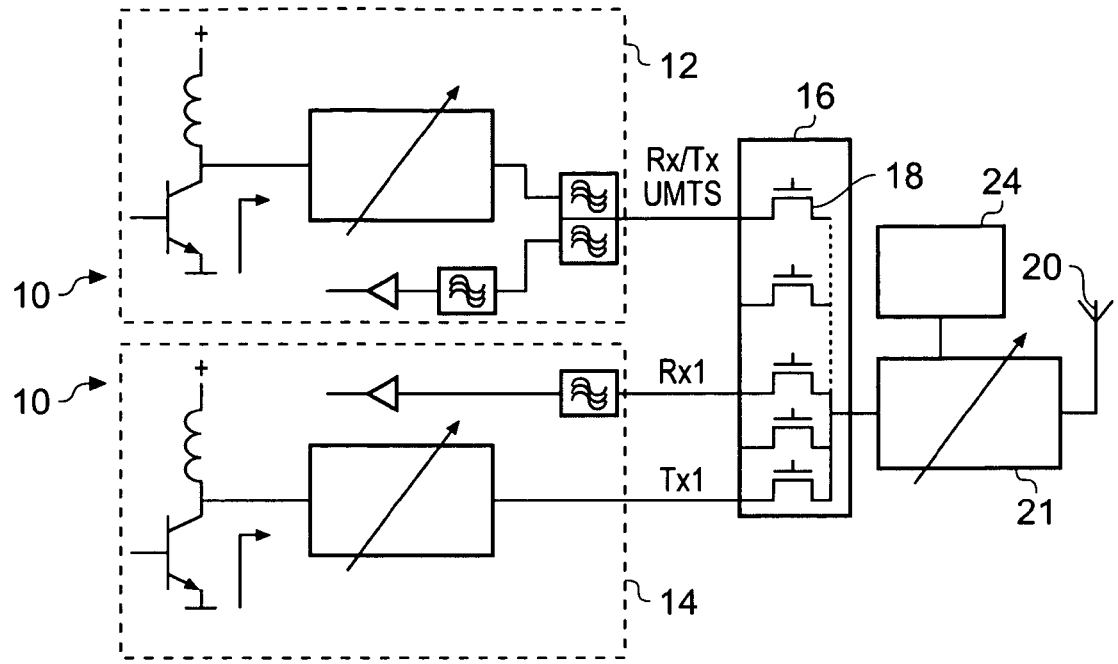
FIG. 1 illustrates a schematic drawing of a circuit using the an embodiment of the invention.

Referring to FIG. 1, a high level block diagram of a part of a mobile device is shown.

The mobile device includes a plurality of output stages 10, in which each output stage 10 is adapted to transmit and receive according to a different mobile telephony standard. In particular a first output stage 12 is arranged for transmission and reception according to the UMTS standard and a second output stage 14 is arranged for transmission and reception according to the GSM standard.

An antenna switch unit 16 includes a plurality of FET switches 18 for switching between the output stages. The FET switches 18 may also be used for switching between transmission and reception where the output stage requires this, for example in the GSM output stage.

The antenna switch unit 16 is connected to antenna 20 through controlled impedance stage 21 which provides a switchable, variable impedance as will be discussed in more detail below.

Thus, the various output stages 10 are connected to the antenna 20 through the controlled impedance stage 21 and through antenna switch unit 16.

A controller 24 is provided to control the controlled impedance stage 21.

Figure 2:
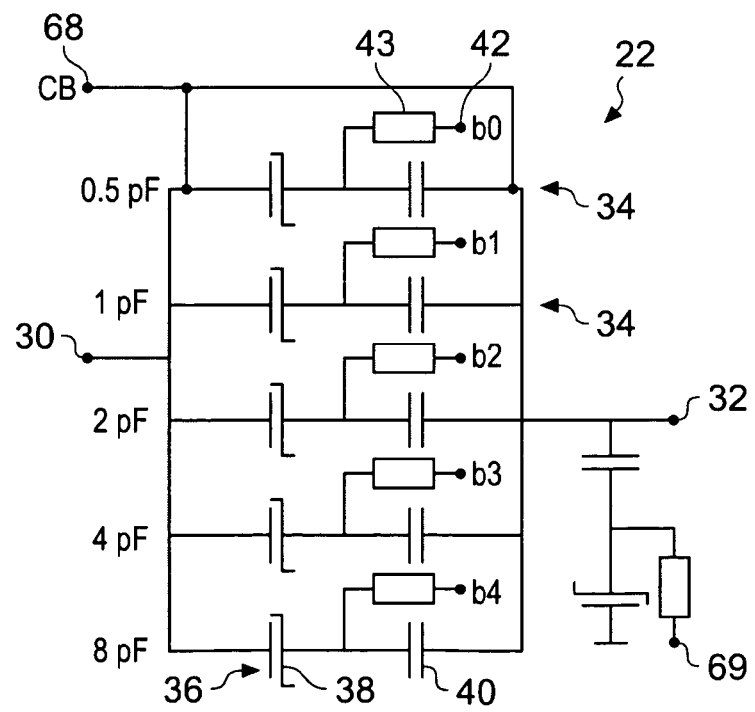
FIG. 2 illustrates a capacitor array used in the embodiment.

The controlled impedance stage 21 includes a switched capacitor array 22 incorporating a plurality of RF MEMS switch cells as illustrated in FIG. 2. In the disclosed embodiment, the switched capacitor array 22 includes an input node 30, an output node 32, and a plurality of capacitor cells 34 connected in parallel between the input and the output node. Each capacitor cell 34 includes a RF MEMS switch unit 36 which can switch into an "on" mode in which the capacitor cell has a predetermined capacitance.

A common bias input 68 is also provided for providing a common dc bias as will be explained in more detail below. A band switch input 69 is used to switch an additional capacitance in parallel to allow switching between different frequency bands, for example between 900 MHz, 1800 MHz and 1900 MHz bands or other bands as may be required.

In the embodiment illustrated, the RF MEMS switch unit 36 is of the two-terminal capacitance type with a two-terminal MEMS switch 38 and a decoupling capacitor 40. Note that the "RF" stands for radio frequency and relates to the fact that the device passes RF signals, not that the switching speed is at radio frequency. The MEMS capacitors 38 are switches are driven by respective control inputs 42; a high voltage is applied to switch the switch 38 to a position in which the RF MEMS unit has the indicated capacitance from a position in which it has a much lower capacitance. When the higher voltage on the control input 42 is replaced by a lower voltage this lower voltage switches the MEMS switch back to its initial position.

Instead of the two terminal MEMS capacitor 38, alternative embodiments use instead a three-terminal MEMS capacitor 38, for example a RF MEMS capacitor switch of the type described in WO 2006/117709. In this case, the decoupling capacitor 40 may not be required, if it is not required, it may be omitted.

The capacitor cells each have a different capacitance, starting at 0.5 pF for the lowest capacitance cell, together with a 1 pF line, a 2 pF line, a 4 pF line, and an 8 pF line. These are in the ratio 1:2:4:8:16 ($2^0:2^1:2^2:2^3:2^4$ or 1:2: ... $2^{m-1}$ for a number of lines m=5) and so represent each bit of a capacitance value, with the 0.5 pF cell corresponding to the least significant bit and the 8 pF cell corresponding to the most significant bit. Thus, a digital input of 11000 corresponds to 12 pF and a digital input of 00001 to 0.5 pF. In this way the cells can easily be driven by a digital signal to control the capacitance of the controlled impedance stage in units of 0.5 pF up to a maximum of 15.5 pF (11111).

Note that there are five control inputs 42 corresponding to the five bits, these are labelled b0, b1, b2, b3 and b4 for the bits ordered from the least significant bit to the most significant bit. A biasing resistor 43 is provided in series with each control input 42.

A band switch input 69 is used to control a further pair of MEMS switch 38 and capacitor 40 that are connected between output node 32 and ground. This switches an additional capacitance between output node 32 and ground depending on the selected frequency band.

Figure 3:
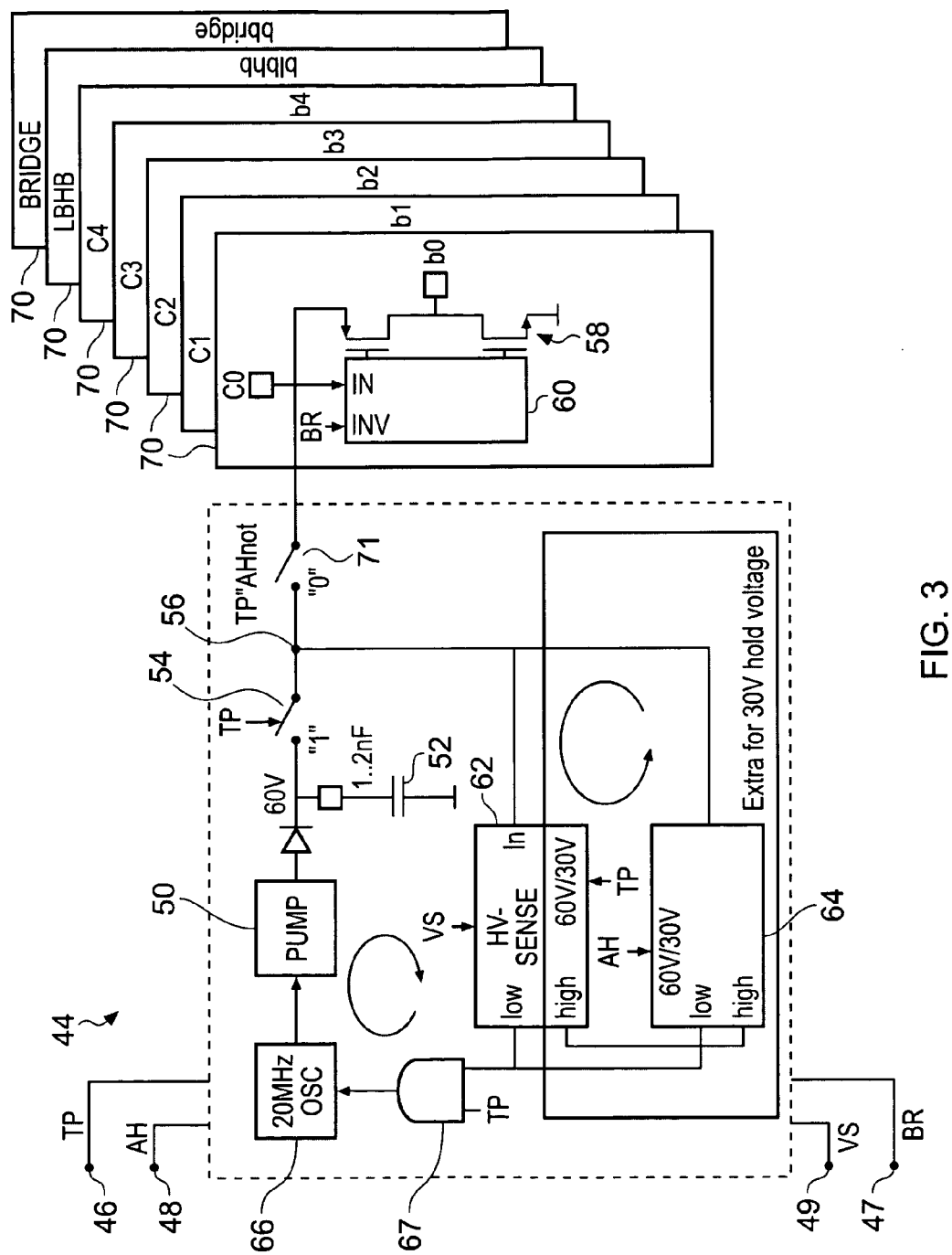
FIG. 3 illustrates a driver for driving the capacitor array of the embodiment.

FIG. 3 illustrates a driver 44 in the controlled impedance stage 21 in more detail. The driver is implemented on a silicon substrate and the design takes into account a number of considerations, not least a desire to reduce the area of silicon required for the design.

In particular, as will be discussed below, the embodiment provides a driver which drives a plurality of MEMS devices in both polarities to reduce dielectric charging and with one or more particular drive signals bearing in mind the need to be able to switch the MEMS devices on and off rapidly and in a way that reduces spurious emissions.

The driver is used to drive the control inputs 42 of the switched capacitor array 22. The driver 44 includes signal inputs 46, 48, the first signal input 46 for receiving a transition period signal TP and the second signal input 48 for receiving an actuation/hold signal. Note that the transition period signal TP indicates every instance of a transition period and the actuation/hold signal is used to select between the higher voltage (60V) output when high and the lower voltage (30V) output when low.

The driver also includes further signal inputs, i.e. a voltage select input 49 and a bridge input 47 whose significance will be explained below.

The driver 44 includes a charge pump 50 which cooperates with capacitor 52 to provide a 60V output.

Control switch 54 is used to selectably connect this capacitor to node 56, which in turn is connected to the high side of a plurality of HV drive circuits, arranged in parallel and each including a push-pull circuit 58. The low side of each push pull circuit is connected to ground.

The plurality of HV drive circuits 70 are provided in parallel to drive the plurality of MEMS switches. Each HV drive circuit 70 includes a switch control 60 used to drive push-pull circuit 58. Each circuit is connected in parallel between node 56 and ground. The first HV drive circuit 70 (as shown) is connected to the first (b0) control input 42 to drive the capacitors of the first bit. Four other HV drive circuits 70 including switch controls 60 and push-pull circuits 58 in parallel are provided to drive the other control inputs (b1-b4). A further HV drive circuit 70 is used for driving the common bias input 68 for full bridge use as will be discussed further. A further HV drive circuit 70 is used to drive the bandswitch input 69 (FIG. 8) as will be described below. Thus, a single driver circuit 44 is used to drive all of the switched MEMS.

The voltage control is provided by the connection of node 56 to high voltage sense unit 62 connected to the first signal input 46 which receives the TP signal which selects between a 30V and a 60V mode. The low and high outputs of the high voltage sense unit 62 are connected both to low voltage control unit 64 with an output connected to node 56 as well as to oscillator 66 used to drive pump 50 through AND gate 67 which is connected to first signal input 46 for driving the pump only when the TP signal is high. The low voltage control unit 64 may be implemented with a window comparator that drives a capacitor with a pair of charge pumps, one which is arranged to positively charge the capacitor when the voltage falls below a low window value (e.g., 29V) and one which discharges the capacitor when the voltage is above a high window value (e.g., 31V). A flip-flop may be used to control the voltage.

The charge pump 50, capacitor 52, high voltage sense unit 62 and oscillator 66 form together a high voltage (60V) control loop for generating 60V and the high voltage sense unit 62 and 30V control unit 64 form a low voltage (30V) control loop for generating 30V.

Note that a capacitor 52 is provided for the high voltage loop but not the low voltage. This is because the high voltage is used for actuating (switching on) the MEMS capacitor switches and the low voltage for holding the MEMS capacitor switches in an "on" state. Thus, the capacitor 52 is needed to source adequate charge to switch the switches rapidly without using an excessively sized charge pump 50.

Figure 4:
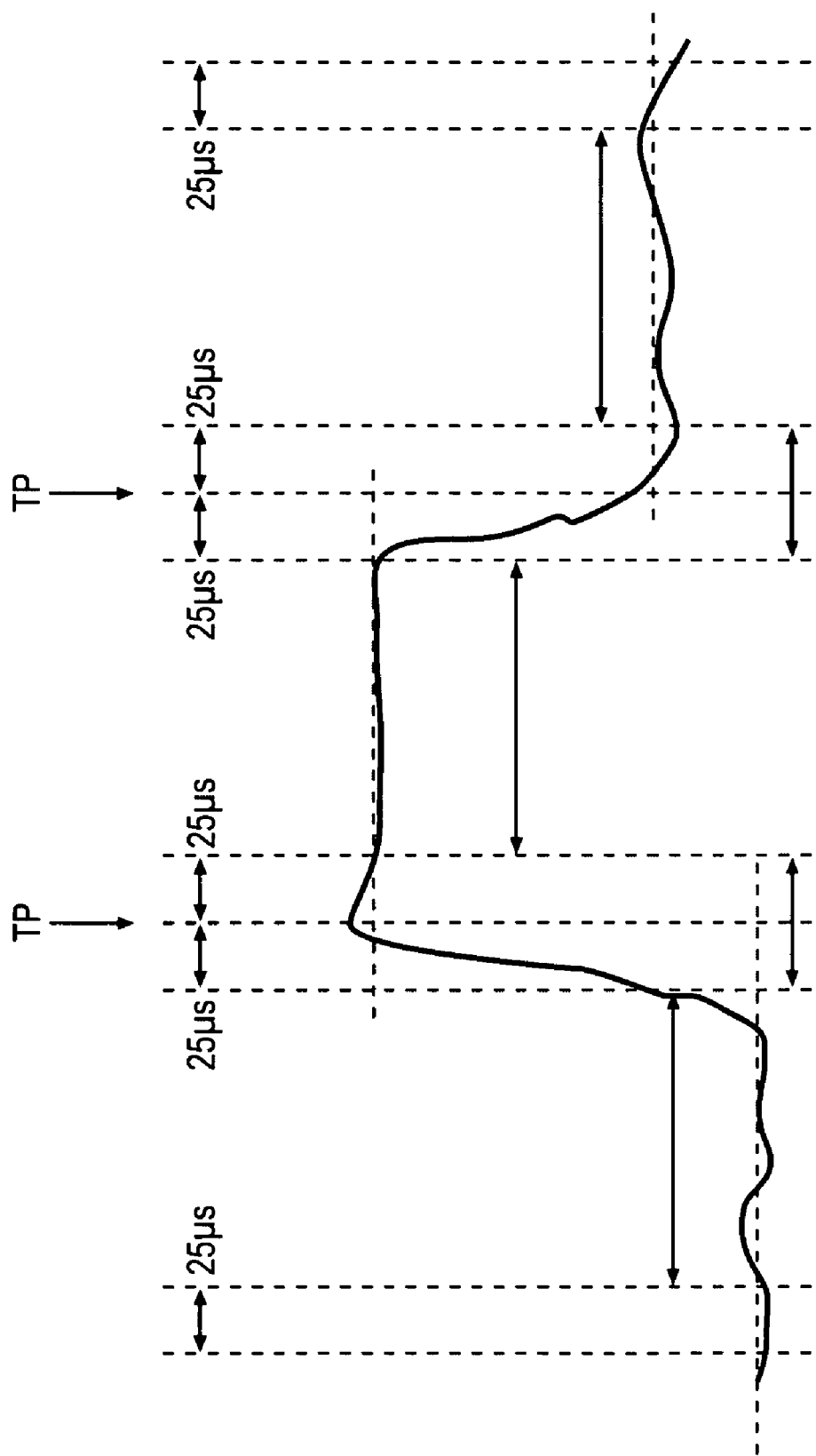
FIG. 4 is a timing diagram illustrating transition periods.

FIG. 4 illustrates a W-CDMA signal on UMTS stage 12 which shows the 50 μs transition period between levels. The transition period signal TP is high during these 50 μs transition periods. Note that in the case that a GSM/EDGE signal is used, the transition period signal TP is high during idle slots.

Figure 5A:
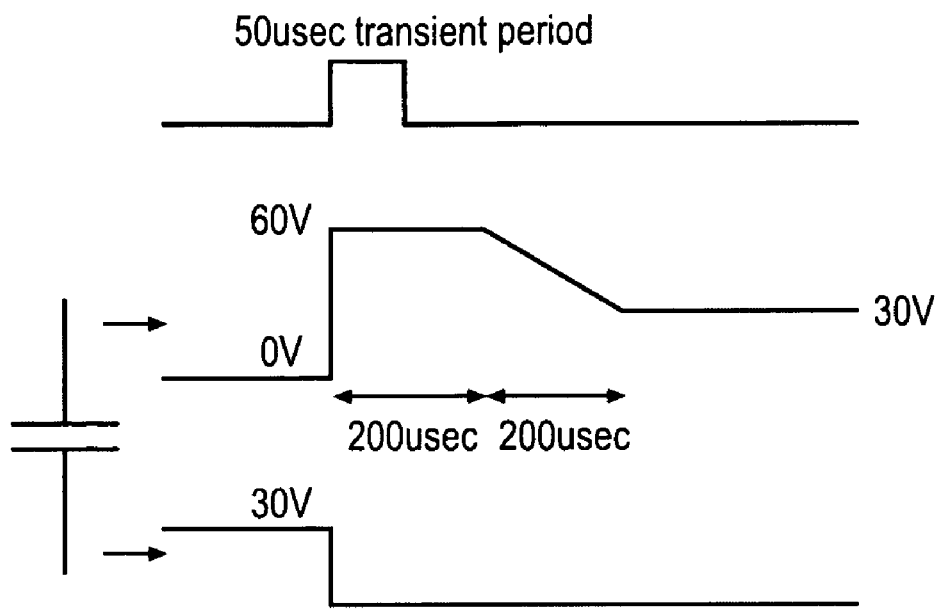
FIGS. 5a and 5b, collectively

A drive pattern achieved by the driver 44 is illustrated in FIG. 5. This describes the switching of an individual switch.

The drive pattern of FIG. 5 is arranged to switch the MEMS switches only during the transition period. The switch is driven at the start of the transition period by a higher voltage (in the example, 60V) for a first predetermined period, which may optionally be longer than the transition period, after which the drive voltage is reduced to 30V which holds the MEMS switch without switching it. This predetermined period may be, for example, 50 μs to 500 μs.

After the predetermined period, the voltage may reduce to a lower voltage over a second predetermined period, which may be, for example, 150 μs to 500 μs. It is not necessary that the first and second periods be the same. Indeed, the second period need not be controlled but may simply be the time that the low voltage control unit 64 takes to reduce the voltage from the higher to the lower voltage. To avoid transient effects, the change from the higher to the lower voltage should be smooth. For this reason, a current source discharge is preferred.

A further feature of the arrangement is that the settling time of a MEMS device can be close to 50 μs. Since this is the length of the transition period, the MEMS device should be switched on at the beginning of the period, i.e., preferably in the first 5 μs.

In order to do this without the buffer capacitor 52 the area of the charge pump required on a semiconductor substrate would be very large. Instead, by using the buffer capacitor 52 of 1 to 2 nF it is possible to charge a 200 pF MEMS device in 5 μs to achieve a reasonably settled on-state by the end of the transition period.

It will be noted from FIG. 3 that, in contrast to the higher voltage loop, a similar buffer capacitor for holding the node 56 at the lower voltage 30V is not provided. There is no need for rapidly changing the voltage to this value. This reduces the silicon area taken up by the driver circuit 44. Instead, the low voltage control loop simply holds the voltage at approximately the correct value. This may be achieved with a window comparator that switches a current source on when the voltage is too low and switches a current sink on when the voltage is too high. Since the leakage current may be only about 5 nA (typically less than 10 nA) the current source need not be capable of producing a large current.

Note that the amount of current discharged through the current sink can effectively set the time for the high voltage to be lowered to the low voltage. In the event that this is too short, a separately selected discharge can be provided.

Note the time that the voltage is held at the higher voltage and the time to change to the lower voltage may be both much longer than the transition period. For example, the MEMS device may be stable after 50 μs but there is no particular need to switch AH to provide the low voltage after 50 μs, the switching may take place after say 200 μs. The timing of the start of the high voltage is important, not the end.

This use of a lower hold voltage of 30V increases the lifetime of the MEMS switch compared with a switch that does not use this pattern.

Note that MEMS switches of the type described can be switched off by applying the same voltage to both sides of the device, i.e., in the arrangement of FIG. 2 the same voltage (which may be ground or which may be the higher/lower voltage) to the common bias terminal 68 and the respective control input 42. Similarly, to switch on such MEMS switches the higher voltage should be applied to one of the common bias terminal 68 and ground to the other of the common bias terminal and the respective control input 42.

Figure 5B:
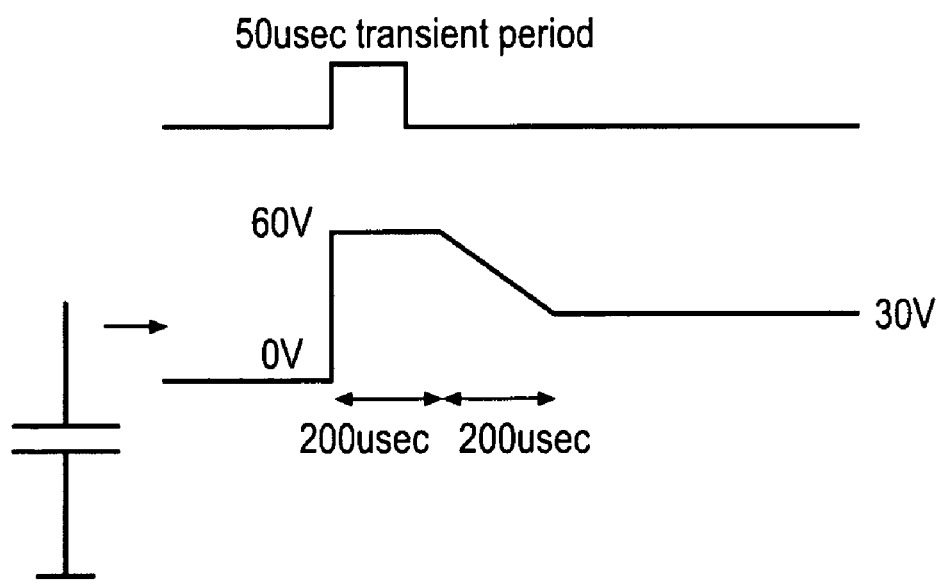
Figure 6:
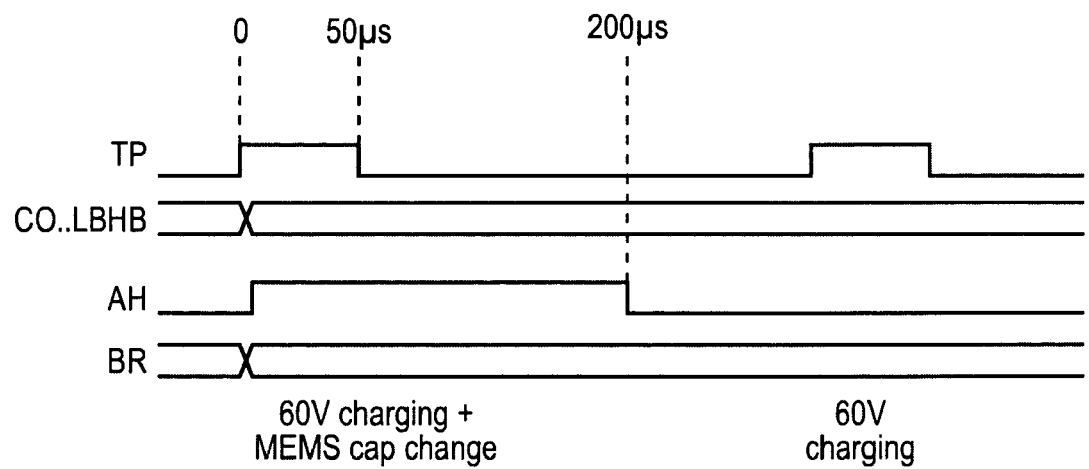
FIG. 6 illustrates the timing of the signals used in an embodiment to control the driver circuit.

FIG. 6 illustrates the signals applied to the driver of FIG. 3 to achieve the result of FIG. 5. The TP signal applied to input 46 signals the transition period, and the AH signal applied to input 48 effectively signals that the driver 44 is to produce a high voltage when AH is high and a low voltage when AH is low.

Firstly, consider how the AH, TP and VS signals supply the higher or lower voltage.

The VS signal applied to input 49 simply determines the value of the high voltage (e.g., 60V), and hence also the low voltage which in the embodiment is half the high voltage.

The first TP pulse in FIG. 6 in combination with the AH signal causes the switching on of selected push-pull circuits 58 and the drive of selected control inputs 42 and common bias input 68 of the switched capacitor array 22 in the manner illustrated in FIG. 5b.

Note that after the signal TP is low (after the end of the transition period) but while AH is still high the low voltage control loop functions to hold the higher 60V voltage. Only when AH goes low, in the example 200 μs after the start of the transition period, does the HV sense circuit 62 operate to sense the lower voltage and the low voltage control unit 64 is then switched to control the voltage on node 56 to be the lower voltage.

Further, note that the circuit does not switch the HV circuits 70 every time TP goes high. If, as illustrated in the second TP pulse of FIG. 6, TP goes high but AH stays low, switch 71 between node 56 and the circuits 70 (FIG. 3) is opened and the capacitor 52 is recharged using the higher voltage control loop. In this state, the opening of switch 71 ensures that this high voltage does not reach circuits 70.

This is used to recharge capacitor 52 during periods of time when no switching is occurring. For example, TP may be high every 0.005 s (i.e., a frequency of 200 Hz) to recharge the capacitor 52 and keep it charged with the high voltage. AH may only go high to switch the MEMS devices every 0.1 s.

When TP goes low again switch 71 is closed and the low voltage control loop of HV sense circuit 62 and low voltage controller 64 again drives node 56 with the lower voltage. Note that by avoiding a capacitor in this loop holding 30V there is no need for an additional switch to decouple such a capacitor during this charging operation of capacitor 52.

Secondly, consider the effect of the bridge signal BR. To implement the drive pattern of FIG. 5, the bridge signal BR is applied to the bridge input 47 and switched at the start of the transition period, i.e., at substantially the same time as the AH and TP signal. As illustrated in FIG. 6, this switch can be from low to high or high to low.

Take as the starting point the state in which the control inputs 42 of the MEMS devices that are on are held at ground and the common bias 68 is at the driven voltage produced by driver 44, at this point in the cycle the lower voltage 30V. MEMS devices that are off have both control and bias inputs the same, at this point in the cycle the lower voltage 30V.

After the BR signal is switched, the common bias 68 is held at ground and the control inputs of devices that are on are connected to the driven voltage produced by the driver 44, which because of the simultaneous change in the AH signal is now the higher voltage 60V. This higher voltage starts reducing after 200 μs and arrives at the lower voltage 30V after a further 200 μs in the illustrated embodiment.

MEMS devices that are off have both control and bias inputs the same, at this point in the cycle the ground voltage 0V.

At the next switching event, at the start of the next transition period, AH, BR and TP are again switched at the same time. The common bias 68 is now held at the higher voltage (60V) and the control inputs of devices that are on are connected to ground.

MEMS devices that are off have both control and bias inputs the same, at this point in the cycle the higher voltage 60V.

This higher voltage starts reducing after 200 μs and arrives at the lower voltage 30V after a further 200 μs in the illustrated embodiment. This returns to the starting point.

Thus, the use of the circuit as described reverses the polarity of voltage every cycle which increases the lifetime of the devices.

Further, note from FIG. 6 that the control inputs can be switched at the same time as the switch of AH, BR and TP which allows a change in the MEMS devices held on at the start of each transition period.

Note that the identity of the control input 42 and common bias input 68 depends on the type of MEMS device, for a two terminal device these two inputs are simply the two terminals, for a three terminal device the central input is the control input and both terminals may be used as the common bias input 68.

The above description describes switching the MEMS switches on. They are switched off at the same point in the cycle, at the start of the transitional period (for example, in the first 5 μs of this period) by driving them with suitable voltages. Since there are no dielectric charges in the off state all that needs to be done is to switch the voltage to 0V across the device and then leave the voltage in that state.

By switching the switched capacitor array off and on only during the transitional period the effects of any high voltage transients are greatly reduced. The transients which occur as the MEMS switches are switched could otherwise easily cause spurious emission.

Another effect that could cause spurious emission is the effect of the high voltage clock output of oscillator 66 which could feed through to create ripple which might mix with the RF carrier to cause spurious emissions.

In the embodiment described the oscillator 66 driving the charge pump 50 is only switched during the transition period. By activating the charge pump only during transition periods spurious emissions from the charge pumps can be minimized. In particular, the oscillator 66 driving the pump is only activated when the signal TP is high. The capacitor 52 keeps the 60V sufficiently constant for the remainder of the period, so the clock does not operate except during the transition period. Note that the clock signal is activated for less time than the full time the capacitor 52 drives 60V which may be, for example, 200 µs followed by a further 200 µs during which time the voltage falls from 60V to 30V to avoid sudden changes of voltage which may themselves cause transients.

A further beneficial effect of the embodiment is that changes in the transfer function during adaptation by switching the switched capacitor array 22 could otherwise cause distortion of the emitted signal.

Thus, the embodiment provides a combination of actuation of the clock only during the transition period to reduce spurious emissions from the clock, together with a longer time period driving the MEMS device at the higher voltage to reduce ripple on the actuation biasing voltage and hence spurious emission from ripple mixing with the RF carrier.

Moreover, by providing a lower (30V) drive voltage to hold the MEMS device in its actuated position the lifetime of the MEMS device is increased.

The above embodiment is described with the higher voltage being 60V and the lower voltage being 30V. However, this choice is based on the specific MEMS devices used and may be varied.

MEMS devices have in general some hysteresis, with a pull-in voltage, the voltage required to activate the switch, and a pull-out voltage, the lower voltage required to deactivate the switch. The driver should produce a higher voltage well above the pull-in voltage, and a lower voltage between the pull-in and the pull-out voltages.

Note that the driver circuit 44 has a voltage select input 49 for providing a voltage input to specify the higher voltage. Conveniently, this voltage is a scaled voltage, so, for example, a voltage of 2.8 V is provided on voltage select input 49 for a 60V output and 1.4V is input for a 30V output. In this way, the driver circuit can produce different voltages simply by adjusting this voltage. However, note that this input is optional and in a production device this voltage select input 49 may be omitted.

Figure 7:
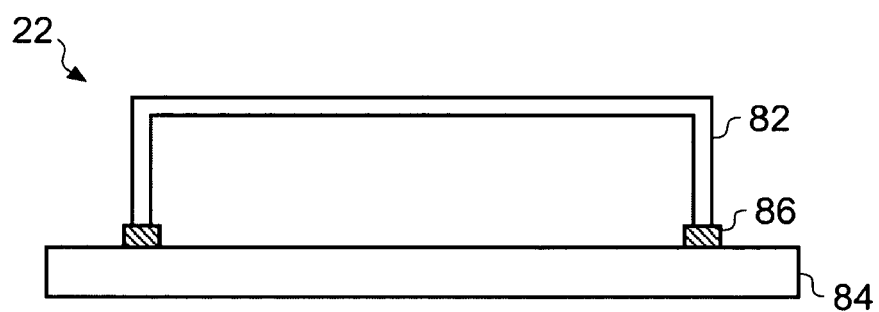
FIG. 7 illustrates the packaging of an embodiment of the invention.

The RF MEMS switches 38 of the switched capacitor array 22 should be hermetically packaged. This will typically be achieved as illustrated in FIG. 7 with a cap 82 over common substrate 84 sealed with solder ring 86 acting as a sealing ring.

Biasing resistors 43 and MEMS switches 38 are integrated on the common substrate 84. Optionally, sensing inductors may likewise be integrated.

This all reduces the number of lines crossing the sealing solder ring 86 which minimizes the influence of the solder ring 86 on the device performance.

The input 30 and output 32 are arranged close together to minimize the self-inductance. Further, the largest capacitors, for the more significant bits, are arranged close to the input 30 and output 32 to minimize the self-inductance.

Optionally, the circuit will include additional components to deal with the significant capacitance to ground constituted by the solder ring 86. Note that this can be of order 0.3 pF to 0.5 pF and hence comparable to the least significant bit. In general, circuits may need to operate at significantly different frequencies, and any matching to compensate for the capacitance to ground of the solder ring needs work at multiple frequency bands and hence the circuit may use components switched based on the band signal input on terminal 69 of the switched capacitor array 22 (see FIG. 1).

One approach might be to use an inductor in series with a switched capacitor but this would need a large RF-MEMS capacitor switch as the switched capacitor which would have a very large area, for example, 1.5 mm$^2$. Further, the large RF MEMS capacitor switch would have a self-resonant frequency uncomfortably close to the high-band of operation.

Figure 8:
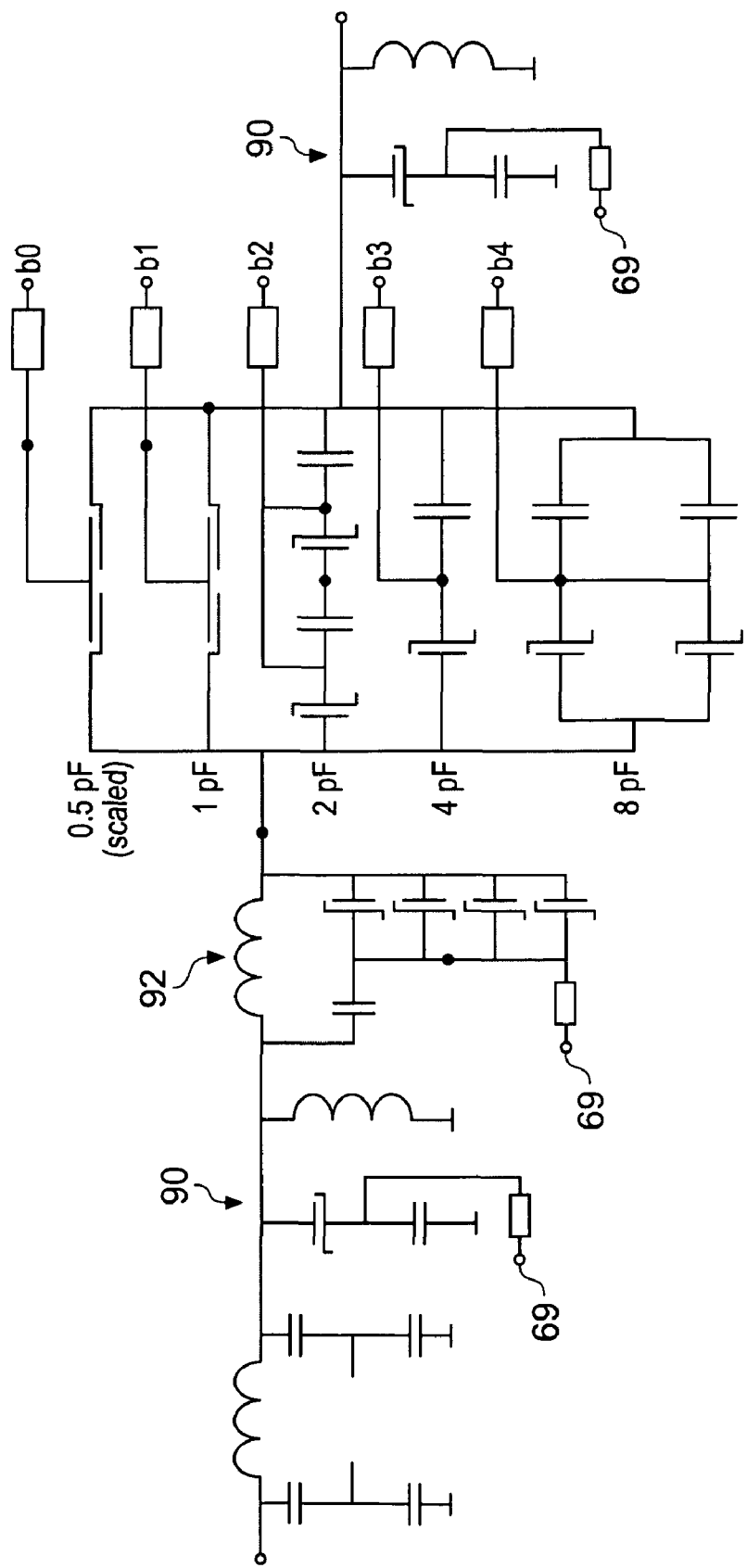
FIG. 8 illustrates a capacitance compensation arrangement used in an embodiment of the invention.

Accordingly, a preferred embodiment uses switched parallel LC circuits to resonate out the unwanted parasitics. FIG. 8 illustrates one arrangement with two switched LC compensation circuits 90, one between the output node 32 and ground, and one between the input signal chain and ground.

To increase the impedance compensation range at multiple frequency bands a switched parallel LC arrangement 92 is provided on the input signal path using multiple switches to provide a switchable impedance.

Figure 9:
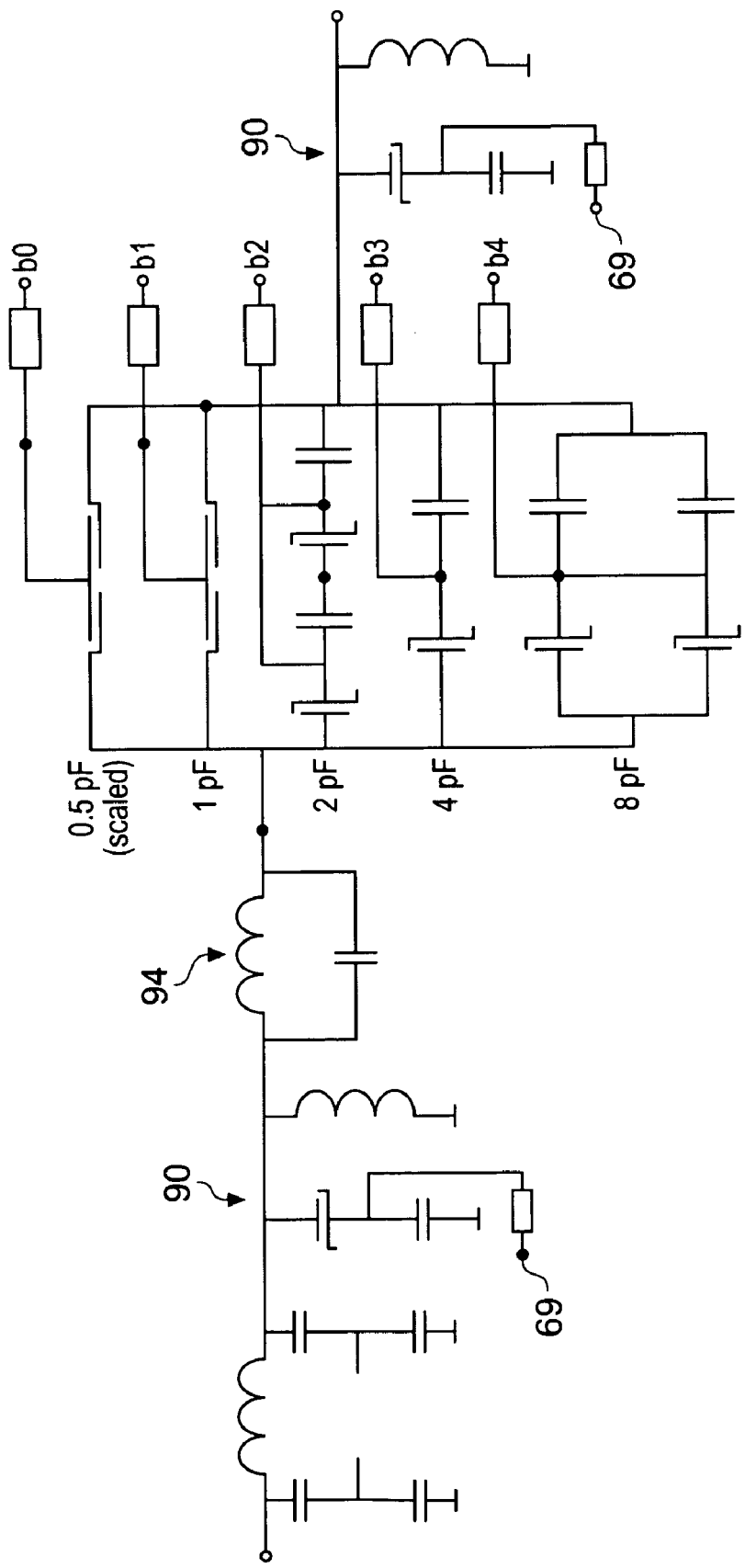
FIG. 9 illustrates an alternative capacitance compensation arrangement used in an alternative embodiment of the invention.

FIG. 9 illustrates an alternative arrangement in which the switched parallel LC arrangement 92 of FIG. 6 is replaced by a parallel unswitched LC arrangement 94 in the input signal path with an inductor and capacitor in parallel. This parallel unswitched LC arrangement 94 is arranged to have a self-resonance between the low band and the high band use, so that the parallel LC circuit behaves as an inductor in the low band and a capacitor in the high band. Thus, both low and high band operation are possible without requiring the additional multiple switches used in the LC arrangement 92 of FIG. 8.

Figure 10:
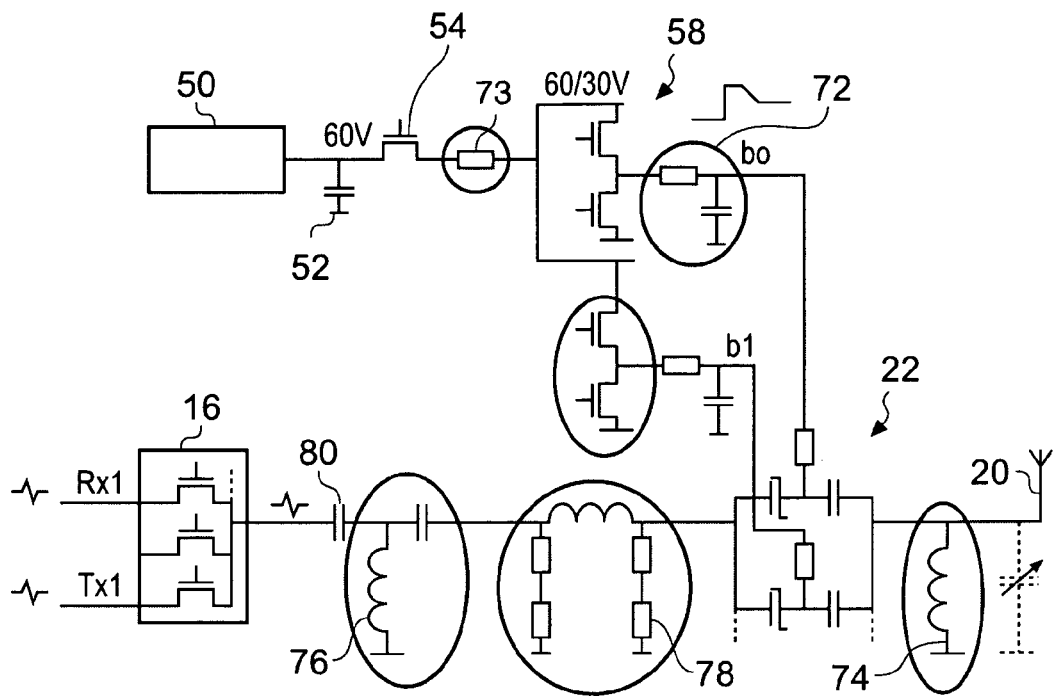
FIG. 10 is a schematic drawing of additions used in a further embodiment of the invention.

A further embodiment is illustrated in schematic FIG. 10. For clarity, some components of the complete device are omitted, these are the same as in the previous embodiment.

In this embodiment, additional filtering is provided to reduce the effect of switching transients.

The first additional filter is provided by resistor 73 between the capacitor 52 and the push-pull circuit 58. In cooperation with the capacitor 52 this reduces the slope of the biasing pulse when the push-pull circuit is switched on.

Secondly, a series low pass filter 72, implemented in the embodiment shown as an RC filter, is provided between push-pull circuit 58 and the switched capacitor array 22.

Thirdly, the transistors of the push pull array can be adapted to reduce their size and increase their resistance—this again has the effect of a low pass filter.

Fourthly, shunt inductors 74, 76 to ground can be applied along the RF path to reduce transients. This will also be an integral path of the impedance matching provided to match the antenna 20 impedance to the drive circuits. Further, the shunt inductor 74 between antenna 20 and switched capacitor array 22 reduces the transmission of electrostatic discharge events from the antenna 20 back into the switched capacitor array 22 and driver circuits thereby relaxing the requirements in this regard of these circuit components.

Fifthly, a high-pass filter is formed by shunt resistors 78 to ground in combination with DC blocking capacitor 80 between antenna switch 16 and the switched capacitor array 22.

By using some or all of these additional filtering techniques, the effects of the high voltage switching causing transients propagating through the network can be reduced.

This is a particular issue with the switches of the antenna switch 16 which may conveniently be implemented as p-type high electron mobility transistors (HEMTs) which can be switched with a voltage of around 2.5V. The presence of 60V switching signals to switch the MEMS capacitors of the switched capacitor array 22 can easily interfere with these HEMTs and cause spurious effects.

In the embodiment of FIG. 10, the slope of the bias pulse is lowered by the low pass filters of resistor 71, low pass filter 72 and higher resistance of the transistors of the push-pull circuit 58. Further improvement is provided by the high-pass filters in the RF signal line.

It is not necessary to used fixed high and low voltages to drive the MEMS devices, such as 30V and 60V, but instead specifically determined voltages can be used either for the devices in parallel or even using a different voltage for each device.

In the embodiments above, the high voltage (60V) is input on voltage select input 49 and this selects the correct voltage.

Figure 11:
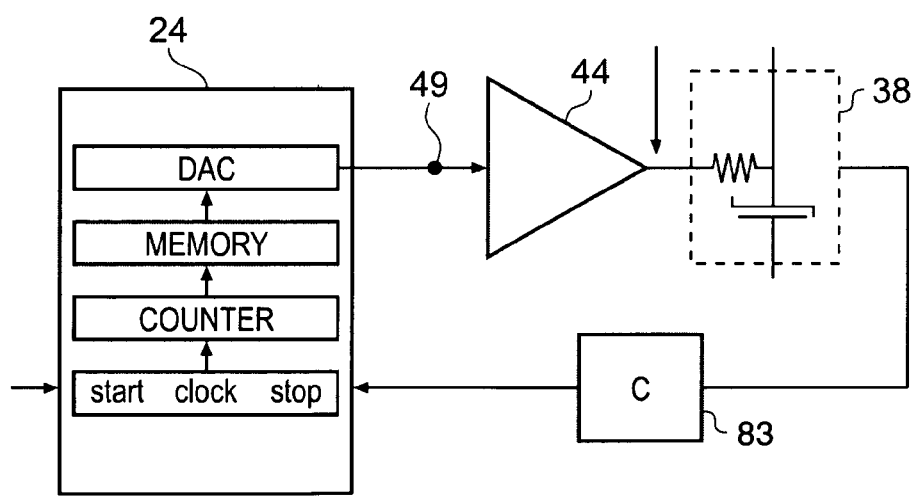
FIG. 11 illustrates a further embodiment of the invention; and The Figures are schematic and not to scale.

In a further embodiment, the driver is arranged to have a special calibration mode in which it ramps up the voltage applied to the MEMS switch while measuring the capacitance of the switch as illustrated in FIG. 11. This uses the voltage select input 49 driven by controller 24 and capacitance measuring unit 83. The voltage at which the switch switches and the capacitance rises is measured. The voltage is then ramped down until the switch switches off. The voltage at which the switch switches is then used as the higher voltage and a voltage a little above the voltage at which the switch switches off as the lower voltage.

The special calibration mode can be entered at start-up or alternatively or additionally at specific time intervals or after a certain amount of use.

It should be noted that the embodiments described above are not exhaustive and those skilled in the art will realize that other components and arrangements may be used as required. Where the description of the embodiments or the circuit diagrams suggest the use of certain components for certain functions, those skilled in the art will realize that alternative components can be used.

What is claimed is:

1. A communications circuit for processing a signal in at least one predetermined communications standard having transition periods during which requirements for distortion and/or spurious emission are relaxed, the communications circuit comprising:
   an input stage for providing a signal in the at least one predetermined communications standard;
   an output stage for outputting a signal received from the input stage;
   a controlled impedance stage coupled between the input stage and the output stage and including a switched capacitor array for changing impedance of the controlled impedance stage;
   a driver for driving the switched capacitor array; and
   a driver control unit arranged to control the driver to switch selected capacitors of the switched capacitor array during the transition periods;
   wherein the driver is arranged to drive the switched capacitor array using a higher voltage or a lower voltage across selected capacitors, wherein the driver is arranged to switch the selected capacitors using the higher voltage, to hold the higher voltage for a predetermined time, and after the predetermined time to start adjusting the higher voltage across the selected capacitors towards the lower voltage.

2. The communications circuit according to claim 1, wherein the driver comprises a clock circuit and a charge pump circuit, the clock circuit being arranged to drive the charge pump circuit, wherein the driver control unit is arranged to drive the clock circuit on only during the transition periods.

3. The communications circuit according to claim 1, wherein the predetermined time is longer than the transition period.

4. The communications circuit according to claim 1, wherein the transition period lasts for a time in the range of 20 μs to 1s and the predetermined time after which the driver starts adjusting the higher voltage towards the lower voltage is in the range of 50 μs to 1s.

5. The communications circuit according to claim 1, wherein the output stage comprises an antenna stage and the input stage is a mobile telephony input stage.

6. The communications circuit according to claim 5, wherein the input stage comprises a GSM and/or EDGE input stage, wherein the transition periods are idle slots of a GSM/EDGE protocol.

7. The communications circuit according to claim 5, wherein the input stage comprises a USTM input stage, wherein the transition periods are the transition periods defined in the USTM specification.

8. The communications circuit according to claim 5, further comprising an antenna switch between the controlled impedance stage and the input stage for switching an antenna between a plurality of input stages and/or between transmission and receiving modes of a single input stage.

9. The communications circuit according to claim 1, wherein the driver further comprises:
   a transition period input for receiving a transition period signal indicating when the signal passing through the controlled impedance stage is in a transition period; and
   at least one high voltage driver output stage for driving the switched capacitor array.

10. The communications circuit according to claim 1, wherein the communications circuit operates in predetermined low and high frequency bands, the communications circuit further comprising a parallel LC circuit in series between the input stage and the controlled impedance stage, the parallel LC circuit having a resonant frequency between frequencies of the predetermined low and high frequency bands.

11. The communications circuit according to claim 1, further comprising at least one high pass filter between the input stage and the output stage.

12. The communications circuit according to claim 1, wherein the input stage comprises one of a plurality of input stages.

13. A communications circuit for processing a signal in at least one predetermined communications standard having transition periods during which requirements for distortion and/or spurious emission are relaxed, the communications circuit comprising:
   an input stage for providing a signal in the at least one predetermined communications standard;
   an output stage for outputting a signal received from the input stage;
   a controlled impedance stage coupled between the input stage and the output stage and including a switched capacitor array for changing impedance of the controlled impedance stage;
   a driver for driving the switched capacitor array;

a driver control unit arranged to control the driver to switch selected capacitors of the switched capacitor array during the transition periods; and a resistance in series between a charge pump and the controlled impedance stage to cooperate with at least one capacitor to act as a low pass filter.

14. A method of operating a communications circuit, the method comprising:

provo a signal in at least one predetermined communications standard having transition periods, requirements for distortion and/or spurious emission being relaxed during the transition periods;

passing the signal through a controlled impedance stage that includes a switched capacitor array for changing impedance of the controlled impedance stage;

selectively activating and deactivating capacitors of the switched capacitor array to control impedance of the controlled impedance stage, wherein activating the capacitors of the switched capacitor array occurs during the transition periods;

activating the switched capacitor array using a higher voltage across selected switched capacitors;

holding the higher voltage for a predetermined time; and after the predetermined time, adjusting the higher voltage towards a lower voltage across the selected switched capacitors.

15. The method according to claim 14, wherein the communications circuit includes a driver with a clock circuit and a charge pump circuit, the method further comprising:

driving the charge pump circuit with the clock circuit only during the transition periods.

* * * * *